United States Patent
Giselmo et al.

(10) Patent No.: US 8,333,073 B2
(45) Date of Patent: Dec. 18, 2012

(54) INTERNAL COMBUSTION ENGINE WITH TWO-STAGE TURBO CHARGING SYSTEM

(75) Inventors: Kent Giselmo, Vellinge (SE); Lars Sundin, Malmö (SE)

(73) Assignee: Volvo Lastvagnar AB, Göteborg (SE)

( * ) Notice: Subject to any disclaimer, the term of this patent is extended or adjusted under 35 U.S.C. 154(b) by 840 days.

(21) Appl. No.: 12/094,477

(22) PCT Filed: Nov. 22, 2005

(86) PCT No.: PCT/SE2005/001749
§ 371 (c)(1),
(2), (4) Date: Aug. 14, 2008

(87) PCT Pub. No.: WO2007/061339
PCT Pub. Date: May 31, 2007

(65) Prior Publication Data
US 2009/0217662 A1    Sep. 3, 2009

(51) Int. Cl.
*F02B 33/44*     (2006.01)
*F02B 33/00*     (2006.01)
*F16K 15/00*     (2006.01)
*F16K 17/00*     (2006.01)
*F01L 3/10*      (2006.01)

(52) U.S. Cl. ............ 60/612; 123/562; 137/517; 251/337
(58) Field of Classification Search ............. 60/612; 123/562; 137/517; 251/337; F02B 37/00, F02B 37/013, 37/22; F02D 9/06, 9/12
See application file for complete search history.

(56) References Cited

U.S. PATENT DOCUMENTS

| | | | | |
|---|---|---|---|---|
| 3,257,797 A | * | 6/1966 | Lieberherr | 60/612 |
| 3,955,595 A | * | 5/1976 | Modes | 137/517 |
| 3,977,195 A | | 8/1976 | Treuil | |
| 4,096,697 A | * | 6/1978 | Treuil | 60/599 |
| 7,600,380 B2 | * | 10/2009 | Grissom et al. | 60/612 |

FOREIGN PATENT DOCUMENTS

| | | | |
|---|---|---|---|
| DE | 19514572 A1 | * | 10/1996 |
| EP | 0477579 A2 | | 1/1992 |
| JP | 1182533 A | | 7/1989 |
| WO | WO 9824671 A1 | * | 6/1998 |

OTHER PUBLICATIONS

International Search Report from corresponding International Application PCT/SE2005/001749, Date of Actual completion:Jul. 4, 2006.
International Preliminary Report on Patentability for corresponding International Application PCT/SE2005/001749, Date of Actual completion:Oct. 16, 2007.

* cited by examiner

*Primary Examiner* — Thai Ba Trieu
(74) *Attorney, Agent, or Firm* — WRB-IP LLP

(57) ABSTRACT

An internal combustion engine is provided with an exhaust gas pipe for taking exhaust gases from the engine's combustion chamber and an intake pipe for supplying air to the combustion chamber. The engine includes a turbo charging system with a high-pressure turbine that interacts with a high-pressure compressor and a low-pressure turbine that interacts with a low-pressure compressor, for recovery of energy from the engine's exhaust gas flow and pressurizing of the engine's intake air. The high-pressure turbine is connected to the low-pressure turbine via a duct. An exhaust gas pressure regulator is located in the duct between the high-pressure turbine and the low-pressure turbine.

10 Claims, 3 Drawing Sheets

INTERNAL COMBUSTION ENGINE WITH TWO-STAGE TURBO CHARGING SYSTEM

BACKGROUND AND SUMMARY

The present invention relates to an internal combustion engine with exhaust gas pipe for taking exhaust gases from the engine's combustion chamber and an intake pipe for supplying air to the said combustion chamber, and a turbo charging system with a high-pressure turbine that interacts with a high-pressure compressor and a low-pressure turbine that interacts with a low-pressure compressor, for recovery of energy from the engine's exhaust gas flow and pressurizing of the engine's intake air, which high-pressure turbine is connected to the low-pressure turbine via a duct.

Diesel engines for heavy vehicles normally require a considerable amount of space as they have various systems for supercharging, cooling and exhaust gas after-treatment. For example, there are turbo-charging systems with two-stage supercharging that are usually based on standard units designed for single-stage charging.

An exhaust gas pressure regulator is used in many types of engine to create a back pressure in the exhaust gas system—, for example in order to improve the braking force of a four-stroke internal combustion engine. In addition, the back pressure from an exhaust gas pressure regulator can be utilized to increase the amount of re-circulated gas to the intake side, so-called EGR-gas. In addition, the back pressure can be utilized for heating up the engine more quickly when starting. An exhaust gas pressure regulator is normally located downstream of turbo charging systems in order not to have an adverse effect on the efficiency.

It is desirable to achieve an internal combustion engine with two-stage turbo charging system and exhaust gas pressure regulator that does not make significant demands in respect of space and weight.

An internal combustion engine designed according to an aspect of the invention comprises an exhaust gas pipe for taking exhaust gases from the engine's combustion chamber and an intake pipe for supplying air to the said combustion chamber, a turbo charging system with a high-pressure turbine that interacts with a high-pressure compressor and a low-pressure turbine that interacts with a low-pressure compressor, for recovery of energy from the engine's exhaust gas flow and pressurizing of the engine's intake air, which high-pressure turbine is connected to the low-pressure turbine via a duct, and is characterized according to the invention in that an exhaust gas pressure regulator is placed in the duct between the high-pressure turbine and the low-pressure turbine. As a result of the position of the exhaust gas pressure regulator according to the invention, an existing component in the turbo charging system can be utilized for exhaust gas pressure regulation, which results in a saving in space and weight.

Advantageous embodiments of the invention are apparent from the following description.

BRIEF DESCRIPTION OF DRAWINGS

The invention will be described in greater detail in the following, with reference to embodiments that are shown in the attached drawings, in which.

DETAILED DESCRIPTION

The invention relates primarily to diesel engines with a piston stroke volume between approximately 6 and approximately 20 liters, for use preferably on heavy vehicles such as trucks, busses and construction machinery. The supercharging is carried out in two stages with two series-connected compressors of the radial type with intermediate cooling. The first compressor stage, called the low-pressure compressor, is driven by a low-pressure turbine of the axial type. The second compressor stage, the high-pressure compressor, is driven by a high-pressure turbine of the radial type.

Figure 1:
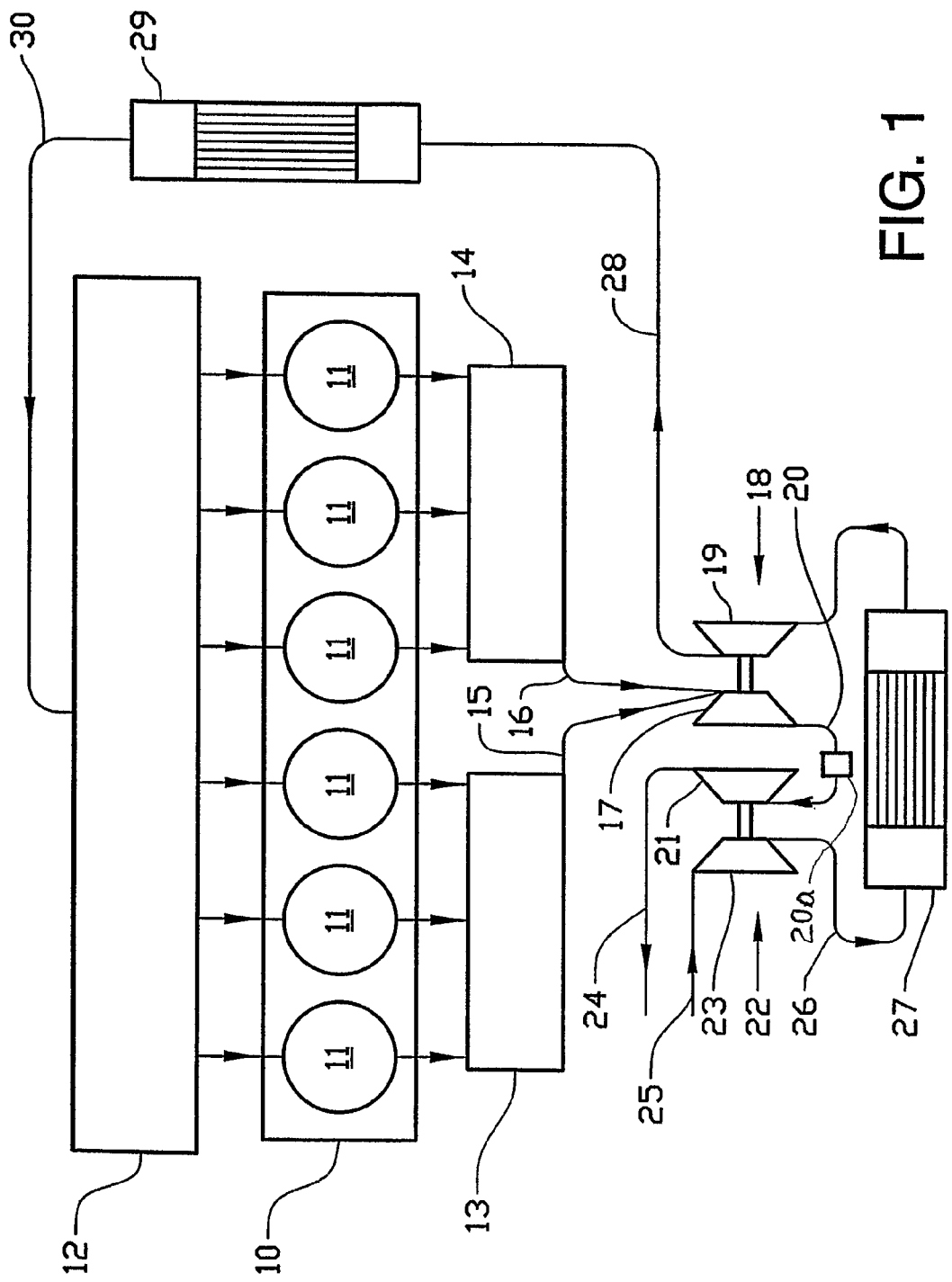
FIG. 1 shows schematically an internal combustion engine with two-stage turbo charging system and exhaust gas pressure regulator according to the invention.

FIG. 1 shows an engine block 10 with six cylinders 11, that communicate in the conventional way with an intake branch pipe 12 and two separate exhaust gas branch pipes 13, 14. Each of these two exhaust gas branch pipes receives exhaust gases from three of the cylinders. The exhaust gases are taken via separate pipes 15, 16 to a turbine 17 in a high-pressure turbo unit 18 that comprises a compressor 19 mounted on a common shaft with the turbine 17.

The exhaust gases are taken, via a duct 20 with an exhaust gas pressure regulator 20a, to a turbine 21 in a low-pressure turbo unit 22 that comprises a compressor 23 mounted on a common shaft with the turbine 21. The exhaust gases are finally taken via a pipe 24 to the engine's exhaust gas system, that can comprise units for after-treatment of the exhaust gases.

Filtered intake air is taken into the engine via the pipe 25 and is taken to the compressor 23 of the low-pressure turbo unit 22. A pipe 26 takes the intake air to the compressor 19 of the high-pressure turbo unit 18 via a first intercooler 27. After this charging in two stages with intercooling, the intake air is taken to a second intercooler 29 via the pipe 28, after which the intake air reaches the intake branch pipe 12 via the pipe 30.

Figure 2:
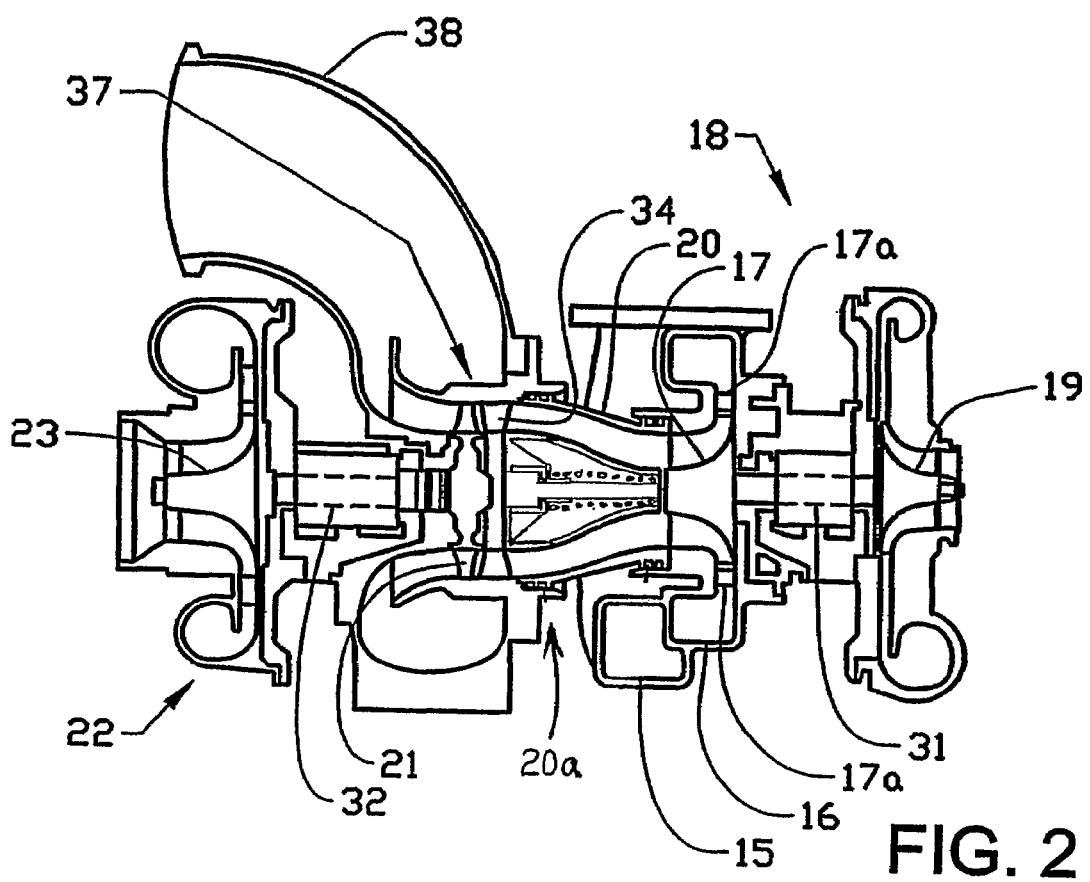
FIG. 2 is a longitudinal section through the two turbo charger stages comprised in the turbo charging system.

The turbo charging system is shown in greater detail in FIG. 2 that shows clearly the double, spiral intakes 15, 16 to the high-pressure turbine 17, each of which supplies half the turbine with gas flow via intake guides 17a. The high-pressure turbine 17 is of the radial type and is connected to the low-pressure turbine 21 via the short intermediate duct 20 that is able to be used due to the fact that the low-pressure turbine is of the axial type. This short flow path minimizes pressure losses between the turbine stages.

The high-pressure turbine 17 is mounted on the shaft 31 together with the high-pressure compressor 19. In a corresponding way, the low-pressure turbine 21 is mounted on the shaft 32 together with the low-pressure compressor 23. The two turbo units 18, 22 are oriented along essentially the same longitudinal axis. The intermediate duct 20 is equipped with seals that counteract internal stresses and leakage by allowing a certain degree of axial and radial movement that takes up thermal forces and a certain degree of assembly tolerances. The exhaust gas pressure regulator 20a is located inside the duct 20 and will be described in greater detail below.

The low-pressure turbine of the axial type is provided with a stator ring 34 with intake guides. The high-pressure compressor 19 is of the radial type. An outlet diffuser 37 is placed after the low-pressure turbine 21 in order to recover dynamic pressure from the turbine. The diffuser opens into an exhaust gas collector 38 that directs the exhaust gases out to the exhaust gas pipe 24.

Figure 3:
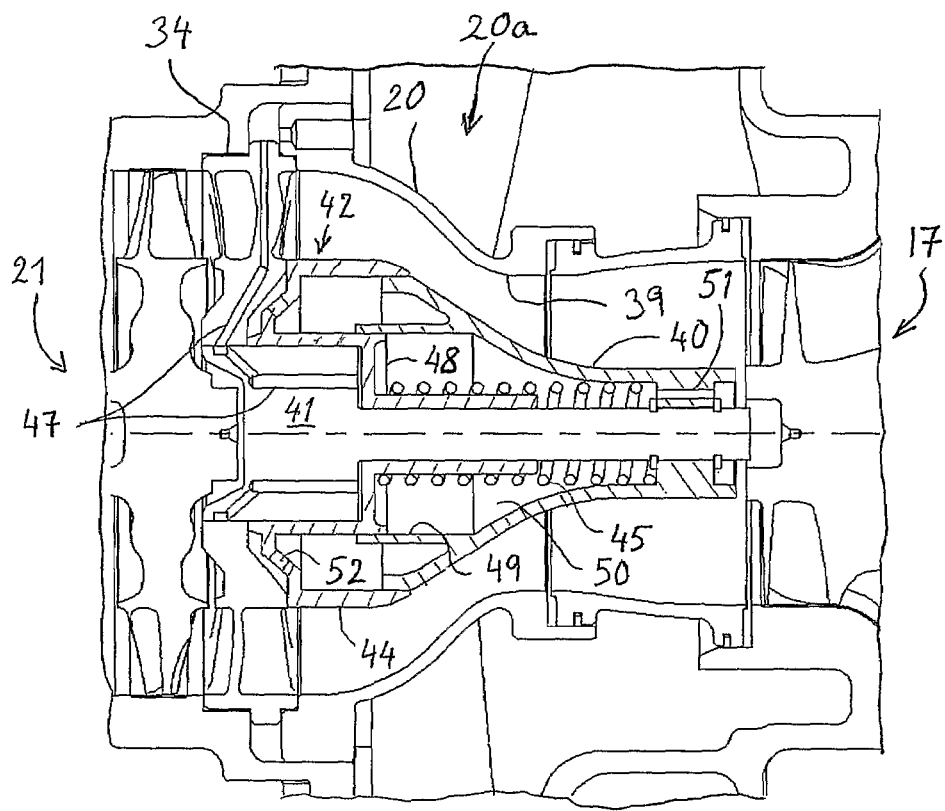
FIG. 3 is a longitudinal section through a duct that connects the two turbo charger stages comprised in the turbo charging system and comprises an exhaust gas pressure regulator shown in an open operative position.
Figure 4:
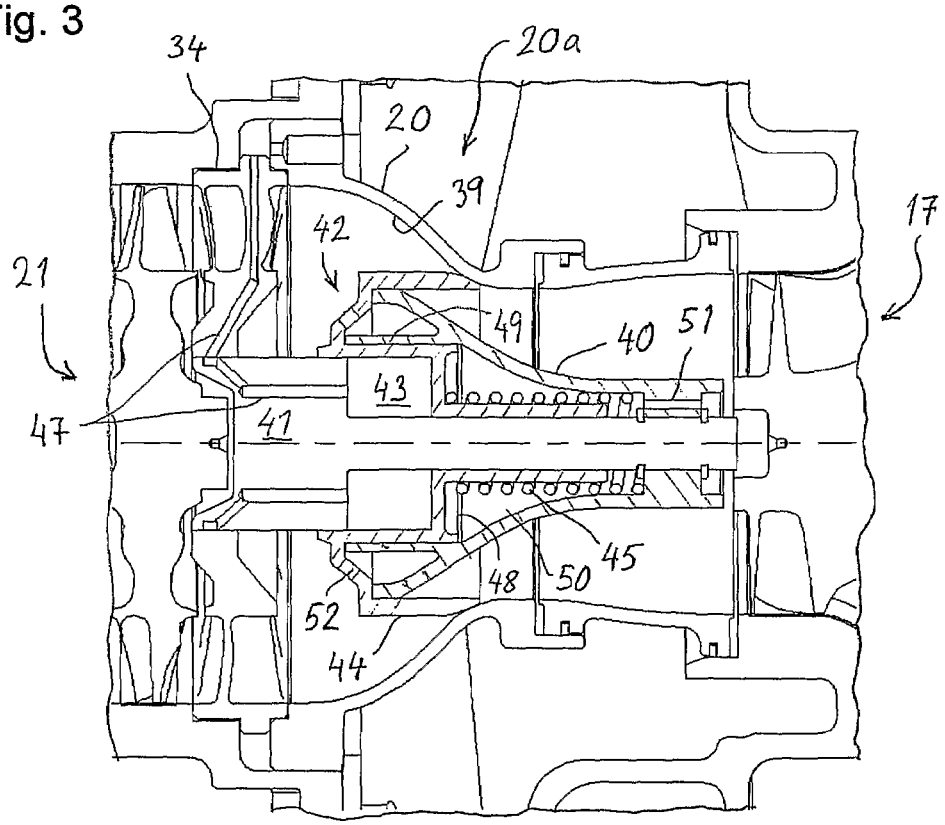
FIG. 4 is a longitudinal section corresponding to FIG. 3 that shows the exhaust gas pressure regulator in a closed operative position.

The design of the exhaust gas pressure regulator 20a is shown in greater detail in FIGS. 3 and 4, that show that the duct 20 has a circular cross section that is constructed of an outer wall 39 that is symmetrical around its axis of rotation and that has a cross section that increases in the direction towards the low-pressure turbine 21, and a central part 40 arranged concentrically inside the wall 39 with a cross section that similarly increases in the direction towards the low-pressure turbine.

The central part 40 is mounted at a distance from the stator ring 34 on the end of a shaft 41 that is attached to the stator ring, and comprises a control piston 42 that is mounted on the shaft 41 in such a way that it can move. The control piston 42 comprises an inner piston chamber 43 with an outer valve sleeve 44. This is designed as an open cylinder with an outer wall surface and an inner wall surface.

The control piston 42 can move axially between the central part and the outer wall 39 to regulate the flow area of the duct 20, against the effect of a helical compression spring 45. The control piston 42 and the shaft 41 together form the circular chamber 43 that is connected to a connection for pressurized medium (not shown in the figures) on the outside of the exhaust gas pressure regulator, via a duct 47 for pressurized medium that runs partly through a part of the shaft 41 that has a larger diameter and partly through the stator ring 34.

By means of variation in the displacement of the chamber 43, the control piston 42 is thus able to be moved with the valve sleeve 44 between an inactive opening position and an active closing position by the effect of a pressurized medium, for example compressed air, that acts in the opposite direction to the direction of the force of the compression spring. In the inactive control position (see FIG. 3), the valve sleeve 44 forms an axial extension of the central part 40 between the central part and the stator ring 34. In the active control position (see FIG. 4), an inner wall surface of the valve sleeve 44 forms an axial extension of the outer wall 39 between the outer wall and the central part 40.

A circular end face 48 of the control piston 42 forms a piston surface that slides with a sealing fit inside a cylindrical part 49 of the central part 40 during the movement of the control piston. The inside of the central part thereby forms a chamber 50 that communicates with the pressure that is immediately downstream of the high-pressure turbine 17 via a duct 51. In addition, there are openings 52 that balance the pressure on the upstream side of the low-pressure turbine 21 with the pressure in the space on the outside of the cylindrical part 49 of the central part 40. Due to the arrangement of the chamber 50 in the central part 40, it is possible to dimension the piston areas in a suitable way, so that pressure balancing of the exhaust gas pressure regulator can be achieved, so that this automatically adjusts itself by self-regulation, according to the exhaust gas flow.

When the exhaust gas pressure regulator is activated according to FIG. 4, the pressure rises downstream of the high-pressure turbine 17 (with a certain delay as the gas is compressible). The pressure is propagated into the chamber 50 via the duct 51. After pressure balancing, this pressure will be approximately the same as the control pressure in the chamber 43, due to the fact that the areas are relatively similar (the chamber 50 has a slightly larger area). If, for example, the pressure increases upstream of the valve, so that the control pressure in the chamber 43 is exceeded, this pressure will be taken into the chamber 50 via the duct 51 and will act against the end face 48. When the control piston 42 has moved a little way to the left, a balance will arise and the control piston finds a position of equilibrium.

The exhaust gas pressure regulator described above is thus self-regulating and opens automatically when there is a certain pressure on the upstream side. In addition, the pressure can be built up rapidly upstream of the exhaust gas pressure regulator, due to the seal being gas-tight.

The invention is described above in an application with a two-stage turbo charging system for supercharging of the internal combustion engine. Alternatively, the invention can be used in an application with a turbo charger unit and a turbo compound unit, where force can be transferred between the turbo compound unit and the crankshaft of the internal combustion engine in order to utilize the kinetic energy for different purposes.

The invention is not to be regarded as being limited to the embodiments that are described above, a number of additional variants and modifications being possible within the framework of the following patent claims. For example, the invention is described in association with a six-cylinder diesel engine, but the system can be utilized with all the different piston engines from one cylinder and upwards, and with two-stroke or four-stroke engines. The invention can also be used with marine engines and with engines that have different piston stroke volumes to those mentioned above. An embodiment with a low-pressure turbine of the axial type has been described above, but the invention can also be used with a low-pressure turbine of the radial type. Other means than pneumatic can be used for operating the valve sleeve, for example mechanical means.

The invention claimed is:

1. An internal combustion engine comprising
   an exhaust gas pipe for taking exhaust gases from a combustion chamber of the engine,
   an intake pipe for supplying air to the combustion chamber,
   a turbo charging system with a high-pressure turbine that interacts with a high-pressure compressor and a low-pressure turbine that interacts with a low-pressure compressor for recovery of energy from an exhaust gas flow of the engine and pressurizing of intake air of the engine, which high-pressure turbine is connected to the low-pressure turbine via a duct, and
   an exhaust gas pressure regulator located in the duct between the high-pressure turbine and the low-pressure turbine, wherein the exhaust gas pressure regulator is self regulating and opens automatically when pressure upstream of the exhaust gas pressure regulator is above a predetermined pressure, the exhaust gas pressure regulator comprising a piston centered on, arranged to move in a direction parallel to, and obstructing flow along an axial centerline of the duct to regulate a flow area of the duct.

2. An internal combustion engine comprising
   an exhaust gas pipe for taking exhaust gases from a combustion chamber of the engine,
   an intake pipe for supplying air to the combustion chamber,
   a turbo charging system with a high-pressure turbine that interacts with a high-pressure compressor and a low-pressure turbine that interacts with a low-pressure compressor for recovery of energy from an exhaust gas flow of the engine and pressurizing of intake air of the engine, which high-pressure turbine is connected to the low-pressure turbine via a duct, and
   an exhaust gas pressure regulator located in the duct between the high-pressure turbine and the low-pressure turbine, wherein the exhaust gas pressure regulator is self regulating by the engine's exhaust gas flow, wherein the low-pressure turbine is of an axial type, and the duct has a circular cross section that is formed of an outer wall that is symmetrical around an adds of rotation of the duct and that has a cross section that increases in a direction towards the low-pressure turbine, and a central part arranged concentrically inside the wall with a cross section that increases in the direction towards the low-pressure turbine.

3. The internal combustion engine as claimed in claim 2, wherein the central part is provided with a control piston that is mounted on the central part, the control piston being axially movable between the central part and the outer wall for regulation of a flow area of the duct.

4. The internal combustion engine as claimed in claim 3, wherein the control piston is movably mounted on a shaft that is attached to a stator ring that is mounted on an intake of the low-pressure turbine.

5. The internal combustion engine as claimed in claim 4, wherein the control piston is movable between two end positions against an effect of a spring device.

6. The internal combustion engine as claimed in claim 5, wherein the control piston is movable between an inactive opening position and an active closing position by an effect of a pressurized medium that acts in a direction opposite to a direction of a force of the spring device.

7. The internal combustion engine as claimed in claim 6, wherein the control piston and the shaft together form a circular chamber with variable displacement for a pressurized medium.

8. The internal combustion engine as claimed in claim 7, wherein the chamber is connected to a connection for pressurized medium on an outside of the duct via a duct for pressurized medium that extends through the shaft and the stator ring.

9. The internal combustion engine as claimed in claim 3, wherein the control piston is provided with a piston surface that is movable in an inner chamber in the central part and is acted upon by pressure upstream of the exhaust gas pressure regulator via a duct for pressure balancing of the control pressure of the exhaust gas pressure regulator.

10. The internal combustion engine as claimed in claim 3 wherein the control piston is designed as an open cylinder with an outer wall surface that, in an inactive control position, forms an axial extension of the central part between the central part and the stator ring, and with an inner wall surface that, in an active control position, forms an axial extension of the outer wall between the outer wall and the central part.

* * * * *